(12) United States Patent
Kojima

(10) Patent No.: US 8,498,008 B2
(45) Date of Patent: Jul. 30, 2013

(54) FIRMWARE DISTRIBUTION DEVICE

(75) Inventor: Atsushi Kojima, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 606 days.

(21) Appl. No.: 12/724,086

(22) Filed: Mar. 15, 2010

(65) Prior Publication Data
US 2010/0315670 A1 Dec. 16, 2010

(30) Foreign Application Priority Data
Jun. 16, 2009 (JP) .................................. 2009-142993

(51) Int. Cl.
G06F 3/12 (2006.01)

(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS

2006/0036832 A1* 2/2006 Makiyama .................. 712/1
2006/0277279 A1 12/2006 Hase
2009/0067629 A1* 3/2009 Kraszewski ................ 380/251

FOREIGN PATENT DOCUMENTS

| JP | H11-003212 | 1/1999 |
| JP | H11-282656 | 10/1999 |
| JP | 2000-194543 | 7/2000 |
| JP | 2002-351635 | 12/2002 |
| JP | 2005-5591 A | 1/2003 |
| JP | 2005-56036 A | 3/2005 |
| JP | 2005-71155 A | 3/2005 |
| JP | 2006-184940 | 7/2006 |
| JP | 2006-343819 | 12/2006 |
| JP | 2008-171289 | 7/2008 |

OTHER PUBLICATIONS

Ueno, Shingo, "Automatic Update Network Printer", Casio Disclosure Journal, Japan, Casio Computer Co., Ltd., Apr. 5, 2002, vol. 189, TJ02-5627, (01-1188).
Japanese Official Action dated Mar. 12, 2013 from related application JP 2009-142993 together with an English language translation.

\* cited by examiner

Primary Examiner — Eric A Rust
(74) Attorney, Agent, or Firm — Scully, Scott, Murphy & Presser, P.C.

(57) ABSTRACT

A first communication device may be configured to receive firmware information sent from a second communication device. The firmware information may include version information of a second firmware that the second communication device has. The first communication device may be configured to send a firmware request to the second communication device in a first case where the version information of the second firmware is newer than version information of a first firmware currently stored in the storing unit. The first communication device may be configured to receive the second firmware sent from the second communication device in response to the firmware request. The first communication device may be configured to update the first firmware currently stored to the second firmware.

9 Claims, 9 Drawing Sheets

FIRMWARE DISTRIBUTION DEVICE

CROSS-REFERENCE TO RELATED APPLICATIONS

This application claims priority to Japanese Patent Application No. 2009-142993, filed on Jun. 16, 2009, the contents of which are hereby incorporated by reference into the present application.

TECHNICAL FIELD

The present specification discloses a technology for a communication device operating in accordance with a firmware.

DESCRIPTION OF RELATED ART

A system that comprises a communication device, which operates in accordance with a firmware, and a firmware distribution server is known. The firmware distribution server stores a firmware to be distributed to the communication device. Upon storing a new firmware or upon receiving a request from the communication device, the firmware distribution server sends version information of the storing firmware to the communication device. In a case where the version information from the firmware distribution server is newer than the version information of a firmware that is currently used by the communication device, the communication device downloads the new firmware from the firmware distribution server and executes a firmware upgrade.

SUMMARY

The firmware distribution server does not operate in accordance with the firmware to be distributed to the communication device. That is, aside from the communication device, another controlling device (e.g., the firmware distribution server in the above case) that stores a firmware not necessary for an operation of itself and distributes the firmware to the communication device is required. In the present specification, a technology is provided by which a version upgrade of the firmware to be used can be executed by the communication device without using the aforesaid another controlling device.

This specification discloses a first communication device to be connected with a network. The first communication device may comprise a storing unit and a controlling unit. The storing unit may be configured to store a firmware. The controlling unit may be configured to communicate with a plurality of communication devices connected with the network. Each of the plurality of communication devices may be configured to operate in accordance with its own firmware. The controlling unit may comprise an information receiving unit, a request sending unit, a firmware receiving unit and an updating unit. The information receiving unit may be configured to receive firmware information sent from a second communication device included in the plurality of communication devices. The firmware information may include version information of a second firmware that the second communication device has. The request sending unit may be configured to send a firmware request to the second communication device in a first case where the version information of the second firmware is newer than version information of a first firmware currently stored in the storing unit. The firmware receiving unit may be configured to receive the second firmware sent from the second communication device in response to the firmware request. The updating unit may be configured to update the firmware stored in the storing unit from the first firmware currently stored to the second firmware.

EMBODIMENT (Configuration of System)

Figure 1:
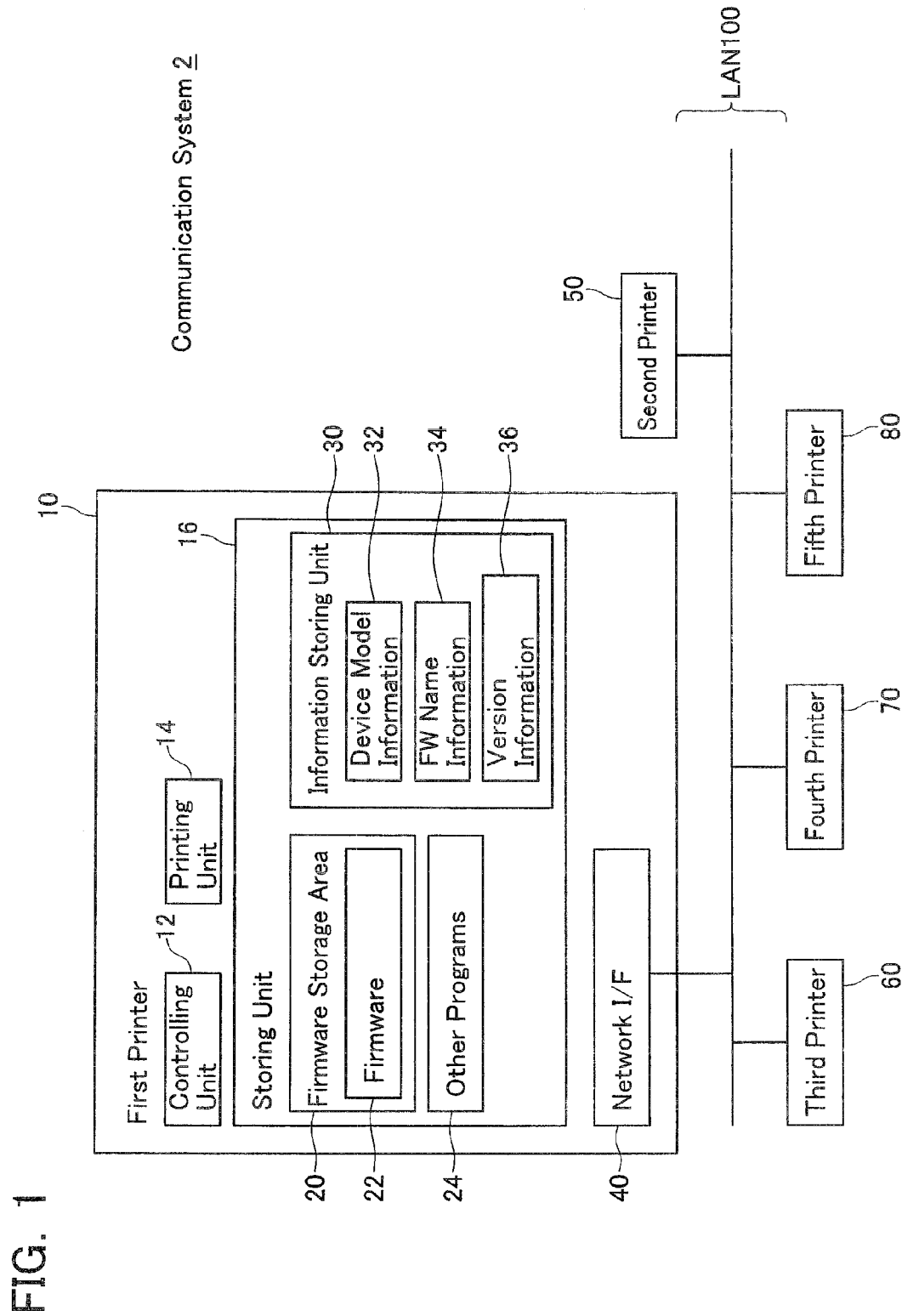
FIG. 1 shows one example of a configuration of a communication system.

An embodiment is described with reference to the drawings. As shown in FIG. 1, the communication system 2 comprises a plurality of printers 10, 50, 60, 70, and 80. Each of the printers 10, 50, 60, 70, and 80 is connected to a LAN 100. Each of the printers 10, 50, 60, 70, and 80 is capable of communication with each other via the LAN 100.

(Configuration of Printer)

Next, description is given regarding a configuration of the printers 10, 50, 60, 70, and 80. First, description is given of a configuration of a first printer 10. The first printer 10 comprises a controlling unit 12, a printing unit 14, a storing unit 16, and a network interface 40. The controlling unit 12 executes processes in accordance with programs 22 and 24 stored in the storing unit 16. The printing unit 14 executes printing in accordance with print data sent from an unshown external device (a PC or the like) connected to the LAN 100. The network interface 40 is connected to the LAN 100.

The storing unit 16 comprises a firmware storage area 20 and an information storing unit 30. The firmware storage area 20 stores a firmware 22. It should be noted that the term "firmware" may be rephrased e.g., as "program". The controlling unit 12 executes various processes in accordance with the firmware 22. That is, the first printer 10 operates in accordance with the firmware 22. The information storing unit 30 stores device model information 32, firmware name information (hereinafter referred to as "FW name information") 34, and version information 36. The device model information 32 is information indicating a device model of the first printer 10. For example, the device model information 32 is a device model name (model name) of the first printer 10. The FW name information 34 is information indicating a type of the firmware 22 currently stored in the firmware storage area 20. The version information 36 is information indicating a version of the firmware 22 currently stored in the firmware storage area 20. In a case where the firmware 22 currently stored in the firmware storage area 20 is updated to a new version firmware, the version information 36 is updated to information indicating the new version. It should be noted that the storing unit 16 further stores a program 24 other than the firmware 22. The program 24 includes a program for updating the firmware 22 currently stored in the firmware storage area 20. Unlike the program (firmware 22) stored in the firmware storage area 20, the program 24 does not undergo updating.

Each of the other printers, being the second printer 50 to the fifth printer 80, comprises a configuration equivalent to the first printer 10. Accordingly, each of the printers of the second printer 50 to the fifth printer 80 comprises a firmware storage area configured to store firmware and an information storing unit configured to store device model information and the like.

(Processes Executed by Printers)

Figure 2:
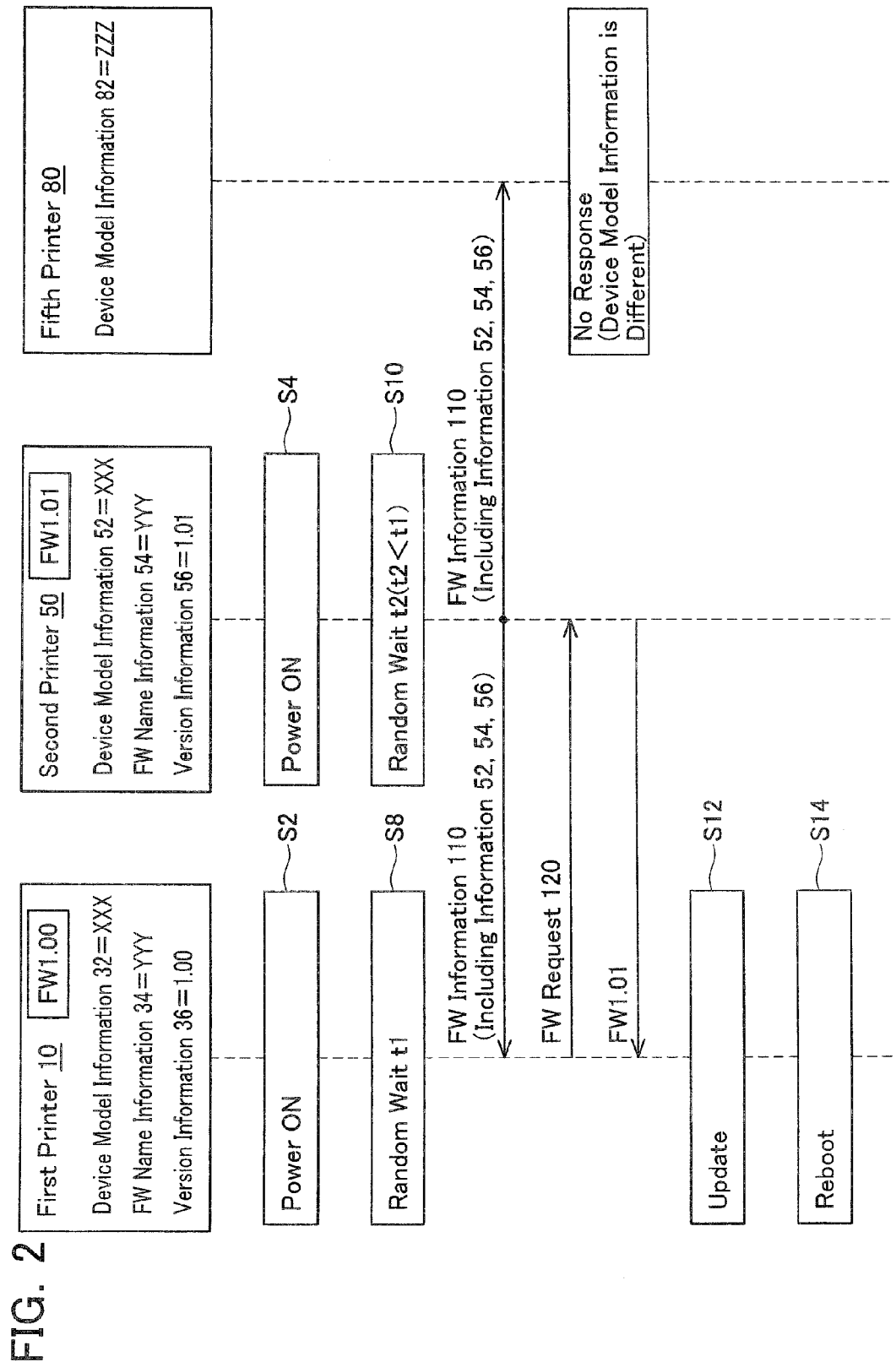
FIG. 2 shows a sequence chart of a case where a first printer obtains a firmware from a second printer to update its own firmware.

Next, description is given regarding processes executed by the printers such as the printer 10. FIG. 2 shows a sequence chart of one example of a process executed by the first printer 10, the second printer 50, and the fifth printer 80. In FIG. 2, the device model information 32 of the first printer 10 and device model information 52 of the second printer 50 are both "XXX," and device model information 82 of the fifth printer 80 is "ZZZ." That is, the first printer 10 and the second printer 50 are the same device model, while the fifth printer 80 is a different device model from the first printer 10. Furthermore, in FIG. 2, the FW name information 34 of the first printer 10 and FW name information 54 of the second printer 50 are both "YYY." That is, the first printer 10 and the second printer 50 have the same type of firmware. Furthermore, the version information 36 of the first printer 10 is "1.00" and version information 56 of the second printer 50 is "1.01." In the present embodiment, a larger number of version information signifies a newer version of firmware. It should be noted that in the following description, firmware of a version V (V is a number such as 1.00) is represented as "FWV" (e.g., FW 1.00).

In FIG. 2, the fifth printer 80 is in a state in which its power is on, and the first printer 10 and the second printer 50 have their power turned on at substantially a same time (S2 and S4). The first printer 10 randomly determines a period t1 within a predetermined range of period (e.g., 0 to 30 seconds), then stands by until the period t1 elapses (S8). Similarly, the second printer 50 also randomly determines a period t2, then stands by until the period t2 elapses (S10). In FIG. 2, the period t2 is shorter than the period 10, and the second printer 50 finishes its standby state earlier than the first printer 10. Upon finishing the standby state, the second printer 50 broadcasts its firmware information (hereinafter referred to as "FW information") 110 including its own device model information 52 (XXX), FW name information 54 (YYY), and version information 56 (1.01). In this way, the FW information 110 is sent to each of the printers 10, 80, etc. connected on the LAN 100 (see FIG. 1).

In the case shown in FIG. 2, each of the printers 10 and 80 receives the FW information 110. In this case, the fifth printer 80 determines whether or not the device model information 52 included in the FW information 110 matches its own device model information 82. The two sets of device model information 52 and 82 are different, and therefore the fifth printer 80 does not sent a response with respect to the FW information 110. The first printer 10 also determines whether or not the device model information 52 included in the FW information 110 matches its own device model information 32. In a case where the two sets of device model information 52 and 32 match, the first printer 10 further determines whether or not the FW name information 54 included in the FW information 110 matches its own FW name information 34. In a case where the two sets of FW name information 54 and 34 match, the first printer 10 further determines whether or not the version information 56 included in the FW information 110 is newer than its own version information 36. In the example of FIG. 2, the version information 56 (1.01) is newer than the version information 36 (1.00). In this case, the first printer 10 sends a firmware request (hereinafter referred to as an "FW request") 120 to the second printer 50 as a response with respect to the FW information 110.

In response to the FW request 120, the second printer 50 sends the FW 1.01, which is stored in its own firmware storage area, to the first printer 10. The first printer 10 consequently receives the FW 1.01. The first printer 10 updates the FW 1.00, which is stored in its own firmware storage area, to the FW 1.01 (S12). Following this, the first printer 10 executes a reboot (restart) (S14).

It should be noted that in FIG. 2, if the device model information 32 of the first printer 10 and the device model information 52 of the second printer 50 did not match, the first printer 10 would not send a response with respect to the FW information 110. Furthermore, if the version information 56 of the second printer 50 matches the version information 36 of the first printer, the first printer 10 does not send a response with respect to the FW information 110. Furthermore, if the version information 56 of the second printer 50 is older than the version information 36 of the first printer 10, the first printer 10 does not send the FW request 120, but broadcasts its own FW information including the sets of information 32, 34, and 36.

Hereinafter, the standby executed by each printer such as the printer 10 from turning on or rebooting until the random period t (e.g., t1) has elapsed is referred to as a "random wait period t." Furthermore, the determination executed by each printer such as the printer 10 as to whether or not the device model information included in the FW information (e.g., 110) matches its own device model information is referred to as a "device model determination process." The determination executed by each printer such as the printer 10 as to whether or not the FW name information included in the FW information and its own FW name information are in agreement is referred to as an "FW name determination process." Further still, a comparison executed by each printer such as the printer 10 between the version information included in the FW information and its own version information is referred to as a "version comparison process."

Figure 3:
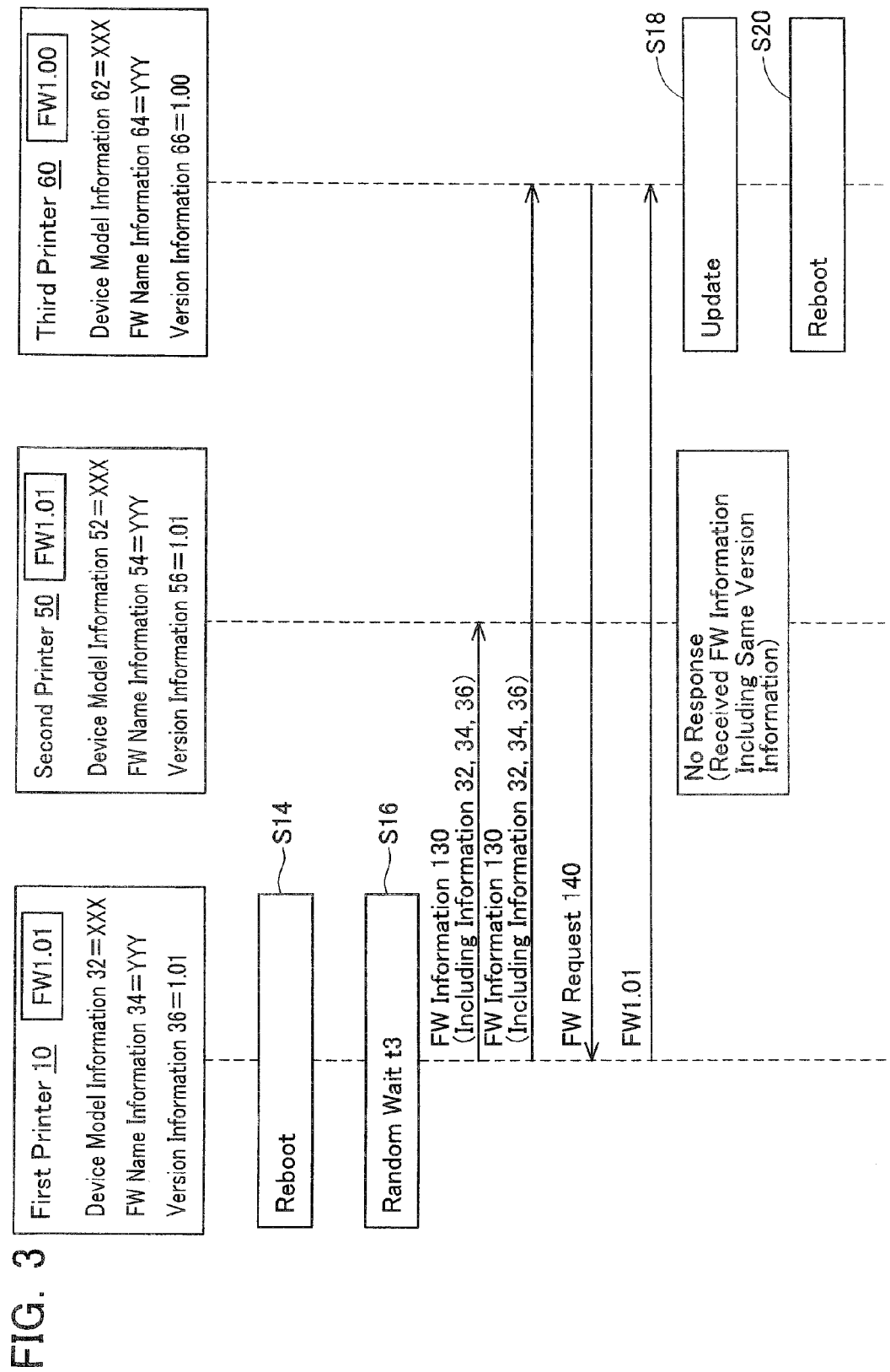
FIG. 3 shows a sequence chart of a case where the first printer, after a firmware update, provides the firmware to a third printer.

FIG. 3 shows a sequence chart of one example of a process executed by the first printer 10, the second printer 50, and a third printer 60. FIG. 3 shows a process after the first printer 10 has executed a reboot at S14 in FIG. 2. Accordingly, unlike the case of FIG. 2, the version information 36 of the first printer 10 is updated to "1.01" (updated to FW 1.01). The third printer 60 has device model information 62 (XXX) and a FW name information 64 (YYY) which are the same as those of the first printer 10. The version information 66 of the third printer 60 is "1.00." It should be noted that in the present embodiment, it is assumed that at a time point when the second printer 50 had sent the FW information 110 (see FIG. 2), the third printer 60 was in a state in which it cannot receive the FW information 110 (e.g., a state in which a communication failure has occurred, or a state in which it is turned off). Therefore, the third printer 60 had not been able to send the FW request in response to the FW information 110. As a result, FW 1.00 of the third printer 60 is not updated to FW 1.01

Upon executing the reboot (S14), the first printer 10 executes a random wait of a period t3 (S16). Next, the first printer 10 broadcasts FW information 130 including the device model information 32 and the FW name information 34 and updated version information 36 (1.01) of the first printer 10. Upon receiving the FW information 130, the second printer 50 executes the device model determination process and the FW name determination process. In a case where these determination processes are determined affirmatively, the second printer 50 further executes the version comparison process. In the example of FIG. 3, the version information 36 (1.01) of the first printer 10 matches the version information 56 (1.01) of the second printer 50. In this case, the second printer 50 does not send a response with respect to the FW information 130.

Upon receiving the FW information 130, the third printer 60 executes the device model determination process, the FW name determination process, and the version comparison process. In FIG. 3, the version information 36 (1.01) of the first printer 10 is newer than the version information 66 (1.00) of the third printer 60. In this case, the third printer 60 sends a FW request 140 to the first printer 10 as a response with respect to the FW information 130. In response to the FW request 140, the first printer 10 sends the FW 1.01, which is stored in its own firmware storage area 20 (see FIG. 1), to the third printer 60. The third printer 60 consequently receives the FW 1.01. The third printer 60 updates the FW 1.00, which is stored in its own firmware storage area, to the FW 1.01 (S18). Next, the third printer 60 executes a reboot (S20).

It should be noted that although processing after S20 is not shown in the diagram, the third printer 60, upon executing a reboot, executes a random wait, then broadcasts FW information including the updated version information 66 (1.01) and the like. Since the first printer 10 and the second printer 50 have the version information 36 and 56, which is the same as the version information 66 (1.01) of the third printer 60, they do not send a response with respect to the FW information from the third printer 60.

Figure 4:
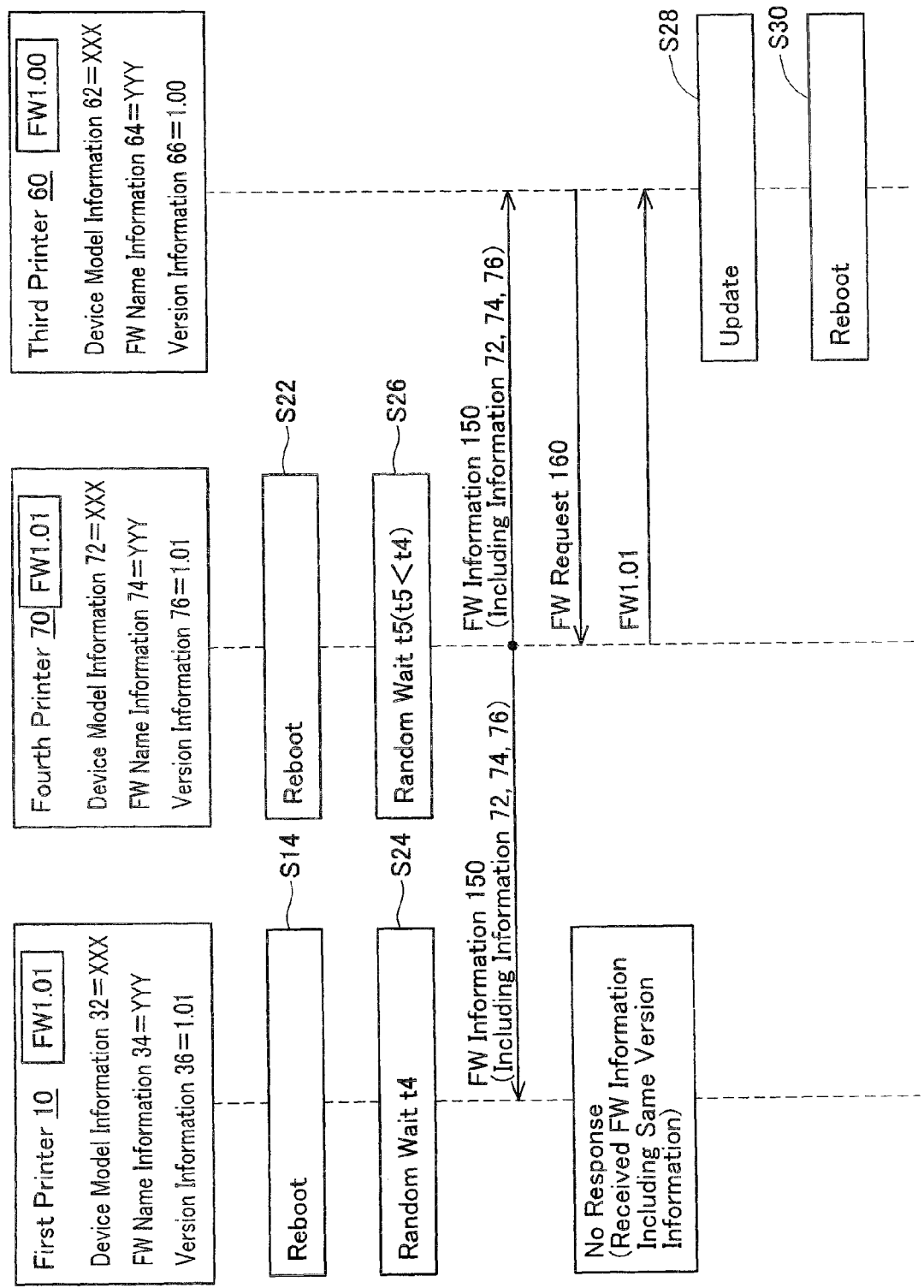
FIG. 4 shows a sequence chart of a case where the first printer does not respond to FW information.

FIG. 4 shows a sequence chart of one example of a process executed by the first printer 10, the fourth printer 70, and the third printer 60. FIG. 4 shows a process after the first printer 10 has executed the reboot at S14 in FIG. 2. The third printer 60 is in the same state as the case of FIG. 3. In the same manner as the printers such the first printer 10, the fourth printer 70 has device model information 72 (XXX), FW name information 74 (YYY), and version information 76 (1.01). It should be noted that, in this case, the fourth printer 70 has sent a FW request as a response with respect to the FW information 110 (see FIG. 2) of the second printer 50 in the same manner as the case of the first printer 10. As a result, the fourth printer 70 has been updated to the FW 1.01, and thus executes a reboot (S22) at substantially the same time as the reboot (S14) of the first printer 10.

Each of the printers 10 and 70 executes a random wait (S24 and S26). In FIG. 4, a period t5 of the fourth printer 70 is shorter than a period 14 of the first printer 10, and therefore the fourth printer 70 broadcasts FW information 150 including its own sets of information 72, 74, and 76 earlier than the first printer 10.

Upon receiving the FW information 150, the first printer 10 executes the device model determination process, the FW name determination process, and the version comparison process. In FIG. 4, the version information 76 (1.01) of the fourth printer 70 matches the version information 36 (1.01) of the first printer 10. In this case, the first printer 10 does not send a response with respect to the FW information 150. As described above, in FIG. 3, the first printer 10 sends the FW information 130 after the reboot (S14). In contrast to this, in FIG. 4, the first printer 10 does not broadcast FW information.

It should be noted that if at least one of the device model information 72 and the FW name information 74 included in the FW information 150 from the fourth printer 70 does not match the device model information 32 or the FW name information 34 of the first printer 10, then the first printer 10 broadcasts FW information including its own sets of information 32, 34, and 36.

The third printer 60 sends a FW request 160 to the fourth printer 70 as a response with respect to the FW information 150. In response to the FW request 160, the fourth printer 70 sends its own FW 1.01 to the third printer 60. The third printer 60 thereby updates its own FW 1.00 to the FW 1.01 (S28), and then executes a reboot (S30).

Figure 5:
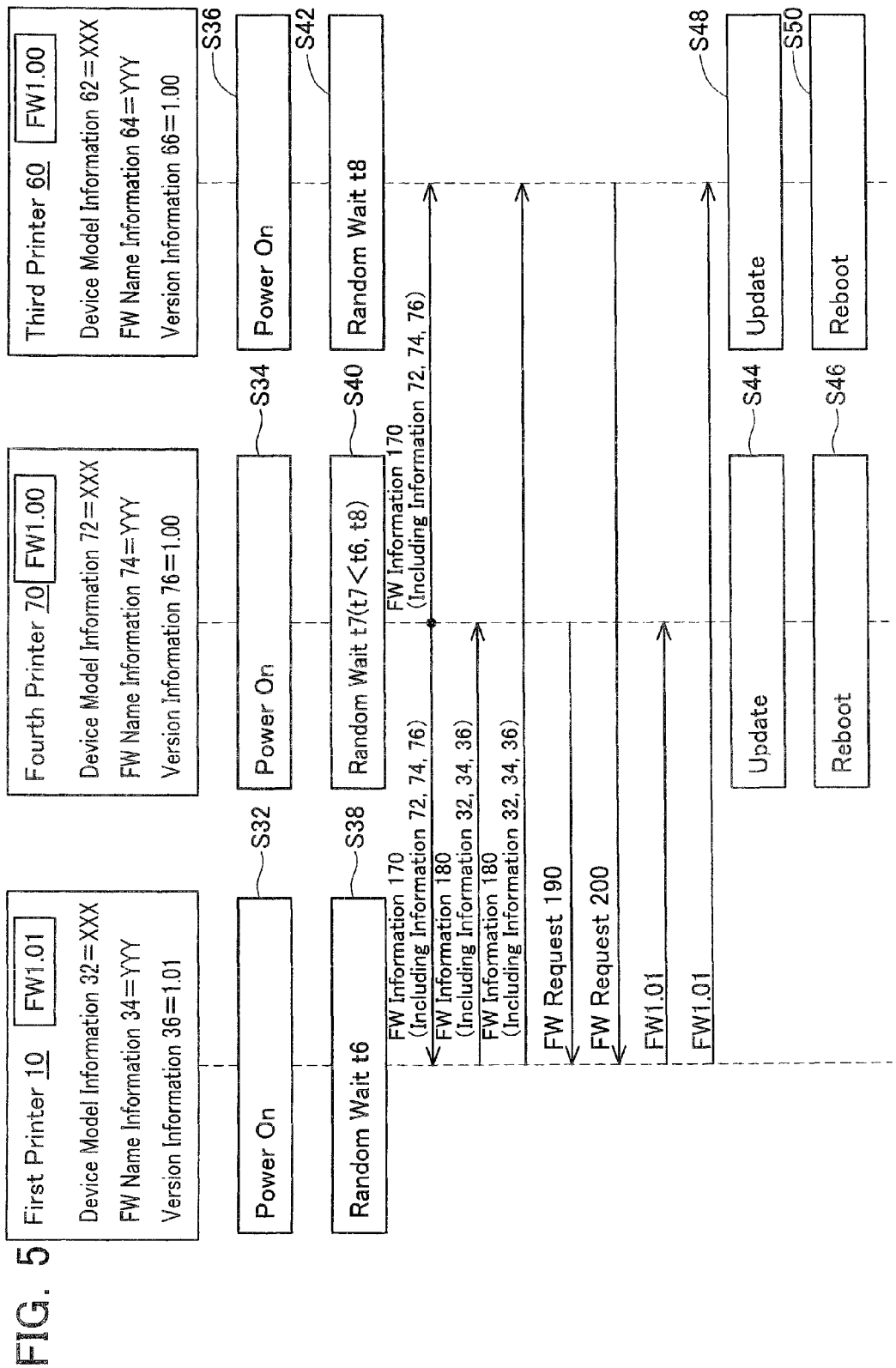
FIG. 5 shows a sequence chart of a case where the first printer provides firmware to the third printer and a fourth printer.

FIG. 5 shows a sequence chart of one example of a process executed by the first printer 10, the fourth printer 70, and the third printer 60. FIG. 5 shows an example in which, after the first printer 10 has executed the reboot at S14 in FIG. 2, it has been turned off. FIG. 5 shows the first printer 10 is thereafter turned on again at S32. Furthermore, unlike the cases of FIG. 3 and FIG. 4, in FIG. 5 the third printer 60 and the fourth printer 70 are kept in turned-off states during a period from the first printer 10 being turned on at S2 of FIG. 2 until being turned off after the reboot at S14. The third printer 60 and the fourth printer 70 are turned on at substantially the same time as a timing (timing of S32) at which the first printer 10 is turned on (S34 and S36). The third printer 60 and the fourth printer 70 have the FW 1.00, which is older than the FW 1.01 that the first printer 10 has.

Each of the printers 10, 60, and 70 executes a random wait (S38, S40, and S42). In FIG. 5, a period t7 of the fourth printer 70 is shorter than the periods t6 of the first printer 10 and t8 of the third printer 60, and therefore the fourth printer 70 broadcasts FW information 170 including its own sets of information 72, 74, and 76 earlier than the first printer 10 and the third printer 60.

Upon receiving the FW information 170, the first printer 10 executes the device model determination process, the FW name determination process, and the version comparison process. In FIG. 5, the version information 76 (1.00) of the fourth printer 70 is older than the version information 36 (1.01) of the first printer 10. In this case, the first printer 10 broadcasts FW information 180 including its own sets of information 32, 34, and 36.

Upon receiving the FW information 170 from the fourth printer 70, the third printer 60 executes the device model determination process, the FW name determination process, and the version comparison process. In FIG. 5, the version information 76 (1.00) of the fourth printer 70 matches the version information 66 (1.00) of the third printer 60. In this case, the third printer 60 does not send a response with respect to the FW information 170.

Upon receiving the FW information 180 from the first printer 10, the fourth printer 70 executes the device model determination process, the FW name determination process, and the version comparison process. In the example of FIG. 5, the version information 36 (1.01) of the first printer 10 is newer than the version information 76 (1.00) of the fourth printer 70. In this case, the fourth printer 70 sends a FW request 190 to the first printer 10. Similarly, upon receiving the FW information 180 from the first printer 10, the third printer 60 sends a FW request 200 to the first printer 10. In response to the FW requests 190 and 200, the first printer 10 sends its own FW 1.01 to the third printer 60 and the fourth printer 70. The third printer 60 and the fourth printer 70 update their own firmware to the FW 1.01 (S44 and S48), then execute reboots (S46 and S50).

Figure 6:
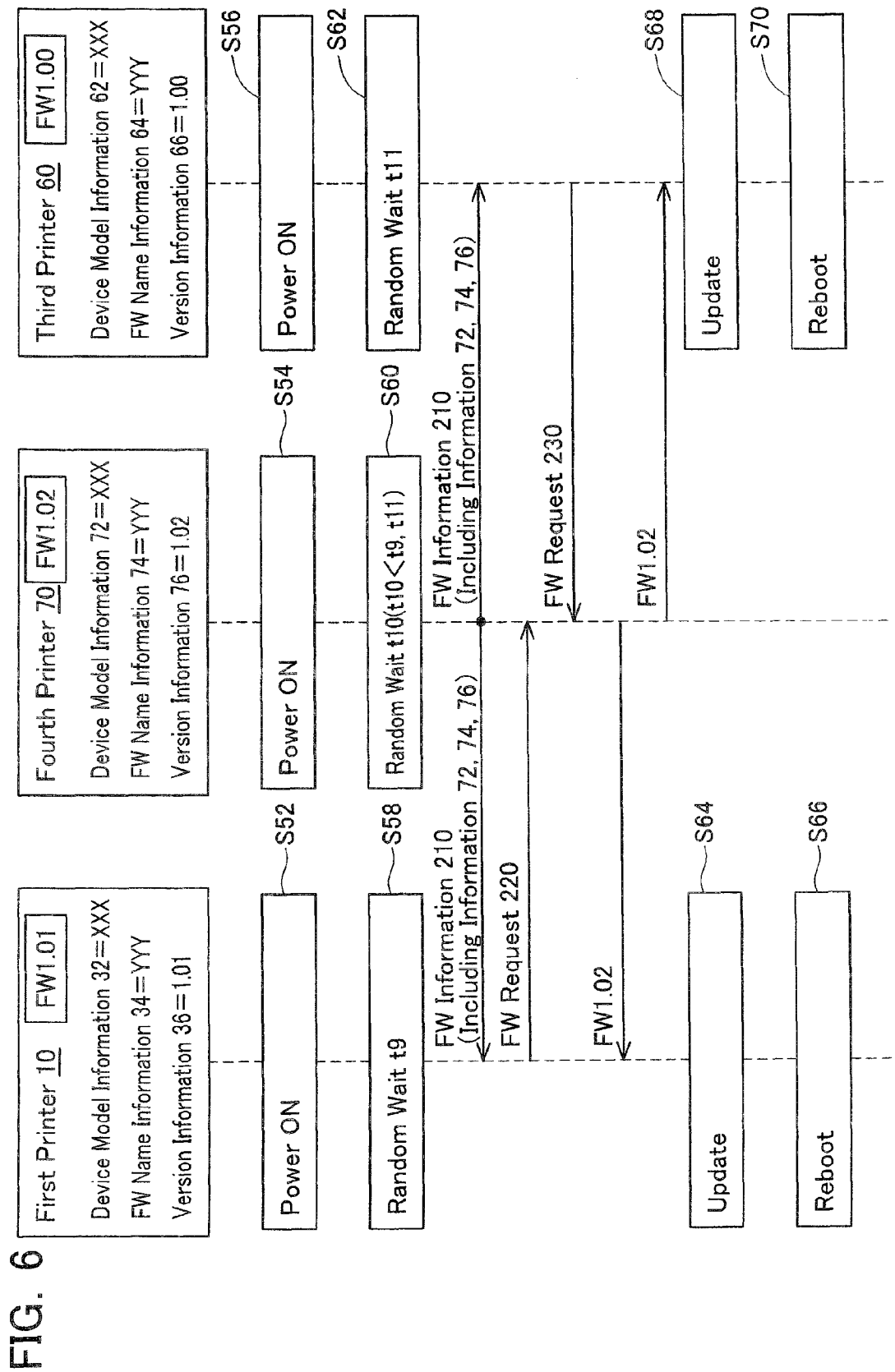
FIG. 6 shows a sequence chart of a case where the fourth printer provides firmware to the first printer and the third printer.

FIG. 6 shows a sequence chart of one example of a process executed by the first printer 10, the fourth printer 70, and the third printer 60. The first printer 10 is in the same state as the case of FIG. 5. Furthermore, the third printer 60 and the fourth printer 70 are in the same state as the case of FIG. 5 except for a point that the version information 76 of the fourth printer 70 is "1.02." Each of the printers 10, 60, and 70 goes into a turned-on state at substantially the same time (852, 854, and S56).

Each of the printers 10, 60, and 70 executes a random wait (S58, S60, and S62). In FIG. 6, a period t10 of the fourth printer 70 is shorter than the periods t9 of the first printer 10 and t11 of the third printer 60, and therefore the fourth printer 70 broadcasts FW information 210 including its own sets of information 72, 74, and 76 earlier than the first printer 10 and the third printer 60.

Upon receiving the FW information 210, the first printer 10 executes the device model determination process, the FW name determination process, and the version comparison process. In FIG. 6, the version information 76 (1.02) of the fourth printer 70 is newer than the version information 36 (1.01) of the first printer 10. In this case, the first printer 10 sends a FW request 220 to the fourth printer 70. Similarly, upon receiving the FW information 210, the third printer 60 sends a FW request 230 to the fourth printer 70. In response to the FW requests 220 and 230, the fourth printer 70 sends its own FW 1.02 to the first printer 10 and the third printer 60. The first printer 10 and the third printer 60 update their own firmware to the FW 1.02 (S64 and 868), then execute reboots (S66 and S70).

Figure 7:
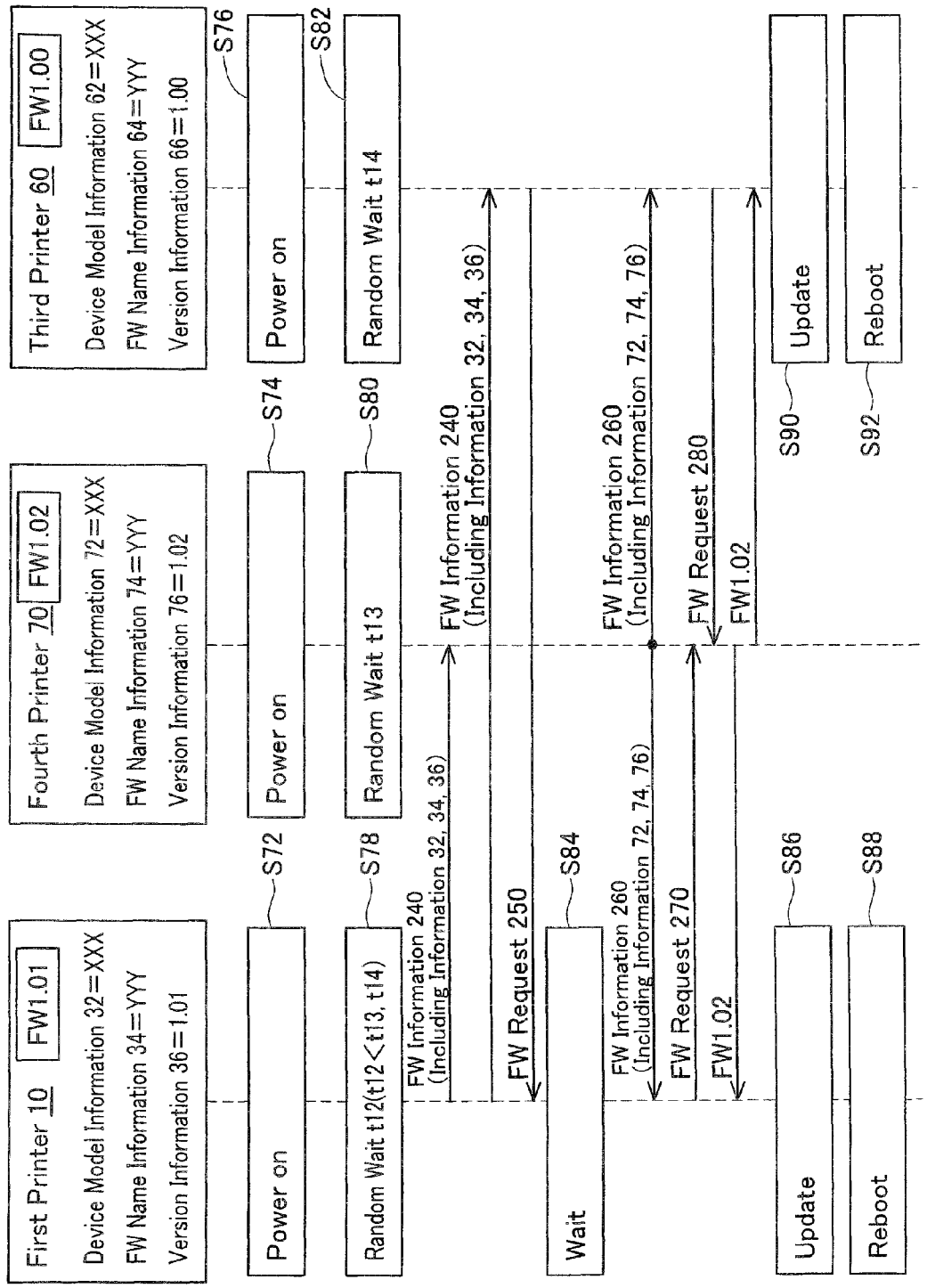
FIG. 7 shows a sequence chart of a case where the first printer, which has received a firmware request, executes a wait.

FIG. 7 shows a sequence chart of one example of a process executed by the first printer 10, the fourth printer 70, and the third printer 60. Each of the printers 10, 60, and 70 is in the same state as the case of FIG. 6. Each of the printers 10, 60, and 70 goes into a turned-on state at substantially the same time (S72, S74, and S76).

Each of the printers 10, 60, and 70 executes a random wait (S78, S80, and S82). In FIG. 7, a period t12 of the first printer 10 is shorter than the periods t13 of the third printer 60 and t14 of the fourth printer 70, and therefore the first printer 10 broadcasts FW information 240 including its own sets of information 32, 34, and 36 earlier than the third printer 60 and the fourth printer 70.

Upon receiving the FW information 240, the third printer 60 executes the device model determination process, the FW name determination process, and the version comparison process. In FIG. 7, the version information 36 (1.01) of the first printer 10 is newer than the version information 66 (1.00) of the third printer 60. In this case, the third printer 60 sends a FW request 250 to the first printer 10.

After receiving the FW request 250 from the third printer 60, the first printer 10 does not immediately sent its own FW 1.01 to the third printer 60. After sending the FW information 240, the first printer 10 stands by for a predetermined time (S84). In a period until the standby state of S84 finishes, the first printer 10 monitors for reception of specific FW information including version information that is newer than its own version information 36 (1.01). In a case where the above-mentioned specific FW information is not received, the first printer 10 sends its own FW 1.01 to the third printer 60 (this example is omitted from the drawing). On the other hand, in a case where the above-mentioned specific FW information is received, the first printer 10 does not send its own FW 1.01 to the third printer 60. Upon receiving the FW information 240 from the first printer 10, the fourth printer 70 executes the device model determination process, the FW name determination process, and the version comparison process. The ver-sion information 36 (1.01) of the first printer 10 is older than the version information 76 (1.02) of the fourth printer 70. In this case, the fourth printer 70 broadcasts FW information 260 including its own sets of information 72, 74, and 76. In this case, the first printer 10 receives the above-mentioned specific FW information during the standby state of S84 and does not send its own FW 1.01 to the third printer 60.

Upon receiving the FW information 260, the first printer 10 sends a FW request 270 to the fourth printer 70. Similarly, upon receiving the FW information 260, the third printer 60 sends a FW request 280 to the fourth printer 70. The fourth printer 70 sends its own FW 1.02 to the first printer 10 and the third printer 60. The first printer 10 and the third printer 60 update their own firmware to the FW 1.02 (S86 and 590), then execute reboots (S88 and S92).

(Details of Processes Executed by Printers)

Next, description is given regarding details of processes executed by the controlling unit 12 of the first printer 10. The controlling units of the other printers 50, 60, 70, and 80 also execute equivalent processes. Each of the processes shown in FIG. 2 to FIG. 7 is achieved by the processing of FIG. 8 and FIG. 9. The process of FIG. 8 commences triggered by a power being turned on or by a reboot.

The controlling unit 12 determines a period T1 in which the random wait is to be executed, and starts a timer (S100). The controlling unit 12 stands by until a value of the timer reaches T1, which was determined at S100 (S102). The process of S102 corresponds to the process of executing the random wait in FIG. 2 to FIG. 7 (e.g., S8 and S10 of FIG. 2). When the value of the timer reaches T1 (YES in S102), the controlling unit 12 determines whether or not first specific FW information was received before the timer value reached T1 (that is, during the standby state of S102) (S104). The first specific FW information is FW information that satisfies all of the following conditions (1) to (3): (1) Including device model information matching its own device model information 32; (2) Including FW name information matching its own FW name information 34; and (3) Including version information matching its own version information 36 or including version information newer than its own version information 36. That is, the controlling unit 12 executes the above-described device model determination process, the FW name determination process, and the version comparison process.

In a case of NO in S104, the controlling unit 12 broadcasts FW information including its own sets of information 32, 34, and 36 (see FIG. 1) (S106). A process of S106 corresponds to the process of sending FW information in FIG. 2 to FIG. 7 (e.g., the FW information 110 in FIG. 2). Next, the controlling unit 12 starts the timer and stands by until a value of the timer reaches a predetermined T2 (S108). A process of S108 corresponds to the process of S84 of FIG. 7.

On the one hand, in a case of YES in 8104, the controlling unit 12 proceeds to S110 without broadcasting FW information (skipping S106). Skipping S106 (i.e., not broadcasting the FW information) corresponds to the first printer 10 not broadcasting the FW information after it has received e.g., the sets of FW information 110 and 150 in FIG. 2 and FIG. 4.

When the value of the timer reaches T2 (YES at S108), the controlling unit 12 determines whether or not second specific FW information was received after executing the power on or the reboot (e.g., during the standby state of S102 or the standby state of S108) (S110). The second specific FW information is FW information that satisfies all of the following conditions (1) to (3): (1) Including device model information matching its own device model information 32; (2) Including FW name information matching its own FW name information 34; and (3) Including version information newer than its own version information 36. For example, when the above-mentioned second specific FW information (which corresponds also to the above-mentioned first specific FW information) is received during the standby state of S102, YES is determined in S104 and YES is determined in S110. Furthermore, when the above-mentioned second specific FW information is received during the standby state of S108, YES is determined in S110.

In a case of YES in S110, the controlling unit 12 sends a FW request to a sending origin of the above-mentioned second specific FW information. A process of S112 corresponds to the process of the first printer 10 sending e.g., the FW request 120 in FIG. 2. It should be noted that in FIG. 3 and FIG. 4, the process of the third printer 60 sending the FW requests 140 and 160 corresponds to a process of S146 of FIG. 9, which is described later, and not to the process of S112. Furthermore, in FIG. 7, the process of the third printer 60 sending the first-time FW request 250 corresponds to the process of S112, but the process of sending the second-time FW request 280 corresponds to the process of S146 of FIG. 9 and not to the process of S112. After S112 has been finished, the controlling unit 12 proceeds to S118.

In a case of NO in S110, the controlling unit 12 determines whether or not a FW request was received during the standby state of S108 (S114). Here, in a case of YES, the controlling unit 12 sends the firmware currently stored in its own firmware storage area 20 (see FIG. 1) to the sending origin of the FW request (S116). A process of S116 corresponds to the process of the first printer 10 sending e.g., the FW 1.01 in FIG. 2. After S116 has been finished, the controlling unit 12 proceeds to S118. It should be noted that in a case of NO in S114, the controlling unit 12 skips S116 and proceeds to S118.

Next, description is given regarding a standby state process executed at 8118. As shown in FIG. 9, the controlling unit 12 monitors for reception of a firmware (S130). For example, in a case where the FW request is received at S112 of FIG. 8, or in a case where the FW request is received at S146, which is described later, a destination of the FW request sends the firmware in response to the FW request. In this case, the controlling unit 12 receives the firmware and determines YES in S130. In a case of YES in S130, the controlling unit 12 updates the firmware currently stored in its own firmware storage area 20 to the received firmware (S132). A process of S132 corresponds e.g., to the process of S12 of FIG. 2. As described above, upon updating the firmware, the controlling unit 12 executes a reboot (see e.g., S14 of FIG. 2). As a result, processing from S100 onward of FIG. 8 is again executed.

The controlling unit 12 further monitors for reception of FW information (S134). For example, in a case where another printer turns on or reboots while the first printer 10 is executing the standby state processing of FIG. 9, the above-mentioned other printer broadcasts FW information (see S106 of FIG. 8). In this case, the controlling unit 12 receives the FW information and determines YES in S134. In a case of YES in S134, the controlling unit 12 determines whether or not its own device model information 32 matches the device model information included in the FW information received at S134 (S136). In a case of NO in S136, the controlling unit 12 returns to S130 without executing the processing of S138 onward. Not executing the process of S138 onward in a case of NO in S136 corresponds to the fifth printer 80 not sending a response with respect to e.g., the FW information 110 in FIG. 2.

In a case of YES in S136, the controlling unit 12 determines whether or not its own FW name information 34 matches the FW name information included in the FW information received at S134 (S138). In a case of NO in S138, the controlling unit 12 returns to S130 without executing the processing of S140 onward. In a case of YES in S138, the controlling unit 12 determines whether or not its own version information 36 is newer than the version information included in the FW information received at S134 (S140). In a case of YES in S140, the controlling unit 12 broadcasts FW information including its own sets of information 32, 34, and 36 (S142). On the other hand, in a case of NO in S140, the controlling unit 12 determines whether or not its own version information 36 is older than the version information included in the FW information received at S134 (S144). In a case of YES in S144, the controlling unit 12 sends a FW request to a sending origin of the FW information received in S134 (S146). A process of S146 corresponds to e.g., the process of the third printer 60 sending the second-time FW request 280 in FIG. 7.

The controlling unit 12 further monitors for reception of a FW request (S148). Here, in a case of YES, the controlling unit 12 sends a firmware currently stored in its own firmware storage area 20 in response to the FW request received at S148 (S150).

Detailed description is given regarding the communication system 2 according to the present embodiment. In FIG. 2, upon receiving the FW information 110 including the version information 56 (1.01) of the second printer 50, which is newer than its own version information 36 (1.00), the first printer 10 sends the FW request 120 to the second printer 50. The first printer 10 receives the FW 1.01 sent from the second printer 50 in response to the FW request 120, and updates its own FW 1.00 to the FW 1.01. In the present embodiment, each of the printers is capable of executing an upgrade of the firmware that it uses without using another controlling device (a controlling device external to the printer) storing firmware(s) that are not necessary for operation of the controlling device itself. With the present embodiment, if an administrator of the communication system 2 updates a single printer (e.g., the second printer 50) to a latest firmware, the latest firmware is sent to the plurality of other printers from that single printer, and therefore the firmware of the plurality of printers can be updated easily.

In FIG. 2, in a case where the device model information 52 and the firmware information 54 of the second printer 50 included in the FW information 110 sent from the second printer 50 match the device model information 32 and the firmware information 34 of the first printer 10, the first printer 10 sends the FW request 120 to the second printer 50. If at least one of the device model information 52 and the firmware information 54 of the second printer 50 does not match the device model information 32 or the firmware information 34 of the first printer 10 (in the case of NO in S110 of FIG. 8), then the first printer 10 does not send the FW request 120 to the second printer 50. With this configuration, it is possible to inhibit carrying out wasteful communication processing involving the first printer 10 obtaining unusable firmware. Furthermore, the first printer 10 can obtain firmware from the second printer 50, which has the same device model information.

Furthermore, in FIG. 3, after executing the firmware update in S12 of FIG. 2, the first printer 10 broadcasts the FW information 130 including the updated version information 36 (1.01). The first printer 10 then receives the FW request 140 from the third printer 60, which has version information 66 (1.00) older than the updated version information 36 (1.01) and sends the FW 1.01 to the third printer 60 in response to the FW request 140. For this reason, the FW 1.01 can be provided from the first printer 10 to the third printer 60 without using another controlling device that stores firmware(s) which are not necessary for the operation of the controlling device itself. With this configuration, the first printer 10 can provide firmware to the third printer 60 having a device model the same as its own.

In the present working example, the printers such as the printer 10 broadcast the FW information (for example the FW information 110) triggered by the execution of power being turned on or the reboot. With this configuration, compared to a configuration in which each of the printers such as the printer 10 periodically broadcasts FW information, a frequency of sending FW information can be reduced. This enables a communication load on a network (e.g., the LAN 100) to be reduced.

Furthermore, in FIG. 4, the first printer 10 and the fourth printer 70 reboot at substantially the same time. In the present embodiment, a random wait (S14 and S22 of FIG. 4) is used, and therefore the timings by which the first printer 10 and the fourth printer 70 broadcast their FW information are different. In FIG. 4, the fourth printer 70, which has the same version firmware 1.01 as the first printer 10, broadcasts FW information 150 first and, as a result, the first printer 10 does not broadcast FW information. It is possible to inhibit multiple sets of same-content FW information being broadcasted.

Furthermore, in FIG. 5, the fourth printer 70, which has the firmware 1.00 of a version older than the first printer 10, broadcasts the FW information 170 first. In this case, the first printer 10 broadcasts the FW information 180. The fourth printer 70 sends the FW request 190 to the first printer 10. In response to the FW request 190, the first printer 10 sends the FW 1.01 to the fourth printer 70. The FW 1.01 can be provided from the first printer 10 to the fourth printer 70 without using another controlling device storing firmware(s) which are not necessary to the operation of the controlling device itself.

Furthermore, in FIG. 6, the fourth printer 70, which has the firmware 1.02 of a version newer than the first printer 10, broadcasts the FW information 210 first. In this case, the first printer 10 sends the FW request 220 to the fourth printer 70. In response to the FW request 220, the fourth printer 70 sends FW 1.02 to the first printer 10. The first printer 10 can upgrade its own FW 1.01 to the FW 1.02. The firmware of the first printer 10 can be upgraded without using another controlling device storing firmware(s) which are not necessary to the operation of the controlling device itself.

Furthermore, in FIG. 7, after the first printer 10 receives the FW request 250 after broadcasting the FW information 240, it executes a wait without immediately sending the FW 1.01 to the third printer 60 (S84). During the wait of S84, when the first printer 10 receives the FW information 260 from the fourth printer 70 having the firmware 1.02 of a version newer than the first printer 10, it does not send the FW 1.01 to the third printer 60. In this way, it is possible to inhibit executing wasteful communication processing involving the FW 1.01, which is not the latest firmware, being sent from the first printer 10 to the third printer 60.

The first printer 10 is capable of sending updated firmware information even after receiving firmware information from a printer different from its own device model. The first printer 10 can receive a firmware request from another printer of a device model the same as its own. In response to the above-described request from another printer, the first printer 10 can send firmware to the above-described other printer.

As is evident from the above description, the first printer 10, the second printer 50, the third printer 60, and the fourth printer 70 according to the present embodiment are examples of a first communication device, a second communication device, a third communication device, and a fourth communication device respectively. In the example of FIG. 2, the process of the first printer 10 receiving the FW information 110, the process of the sending the FW request 120, the process of receiving the FW 1.01, and the process of executing the update of S12 are examples of processes executed by an information receiving unit, a request sending unit, a firmware receiving unit, and an updating unit respectively. Furthermore, the FW information 130 of FIG. 3 and the FW information 180 of FIG. 5 are examples of updated firmware information. Accordingly, in FIG. 3 and FIG. 5, the process of the first printer 10 broadcasting the FW information 130 and FW information 180 is one example of processing executed by a first information sending unit. Furthermore, in FIG. 3, the process of the first printer 10 receiving the FW request 140 and the process of sending the FW 1.01 are examples of execution processes of the first request receiving unit and the first firmware sending unit respectively.

Furthermore, a case where the first printer 10 receives the FW information 150 from the fourth printer 70 in FIG. 4 is one example of "a second case", and a ease where the first printer 10 receives the FW information 170 from the fourth printer 70 in FIG. 5 is one example of "a third case". Furthermore, if in FIG. 5 the second printer 50 having same information as the sets of information 72, 74, and 76 possessed by the fourth printer 70 is used instead of the fourth printer 70, a case where the first printer 10 receives the FW information 170 from the second printer 50 is one example of "a fourth case". Accordingly, the process of the first printer 10 sending the FW information 180, the process of receiving the FW request 190, and the process of sending the FW 1.01 are examples of a second information sending unit, a second request receiving unit, and a second firmware sending unit respectively. Furthermore, in FIG. 2, the process of the second printer 50 sending the FW information 110, the process of receiving the FW request 120, and the process of sending the FW 1.01 are examples of an information sending unit, a request receiving unit, and a firmware sending unit respectively.

Figure 8:
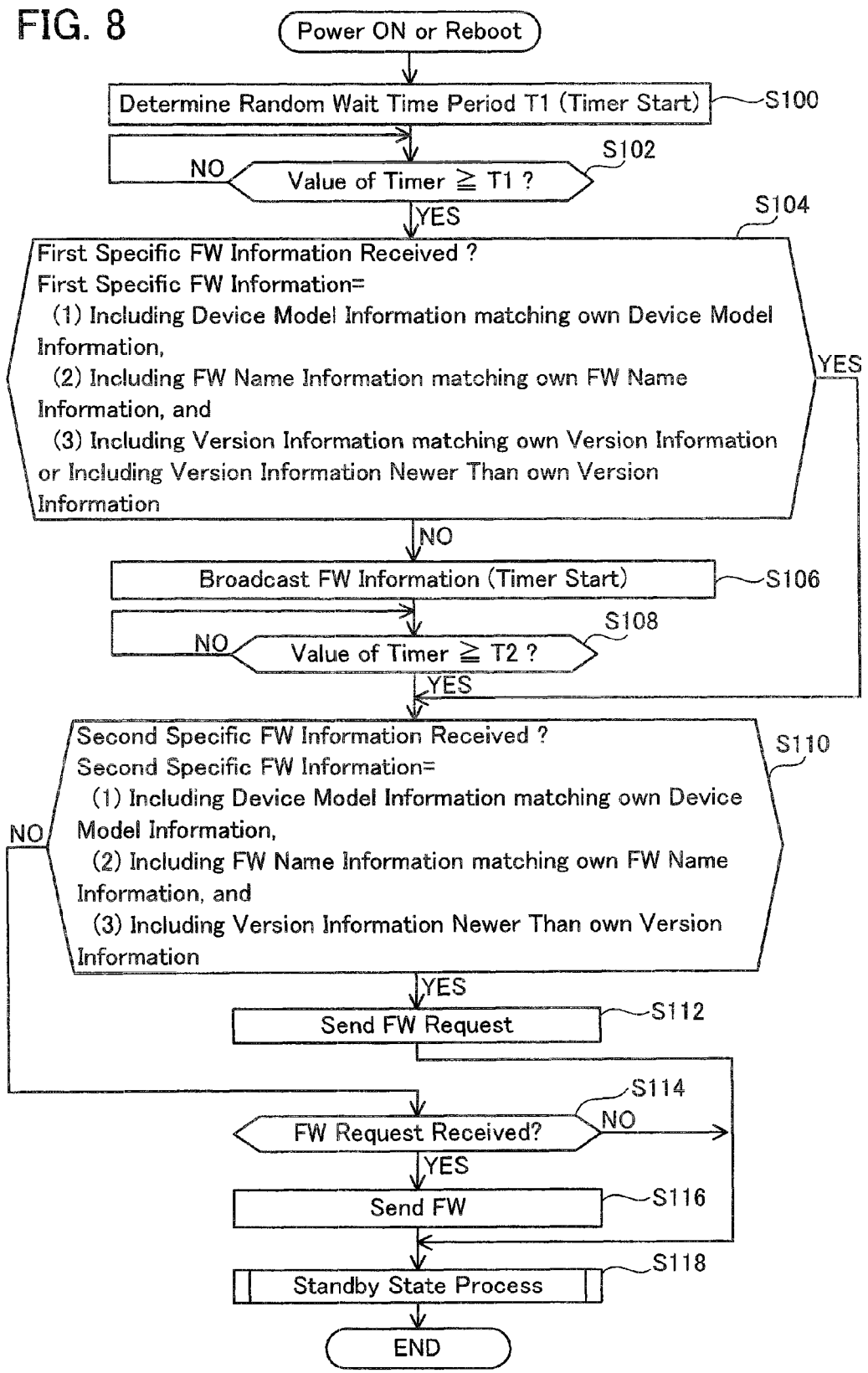
FIG. 8 shows a flowchart of a process executed by a printer at a time of turning on or rebooting.
Figure 9:
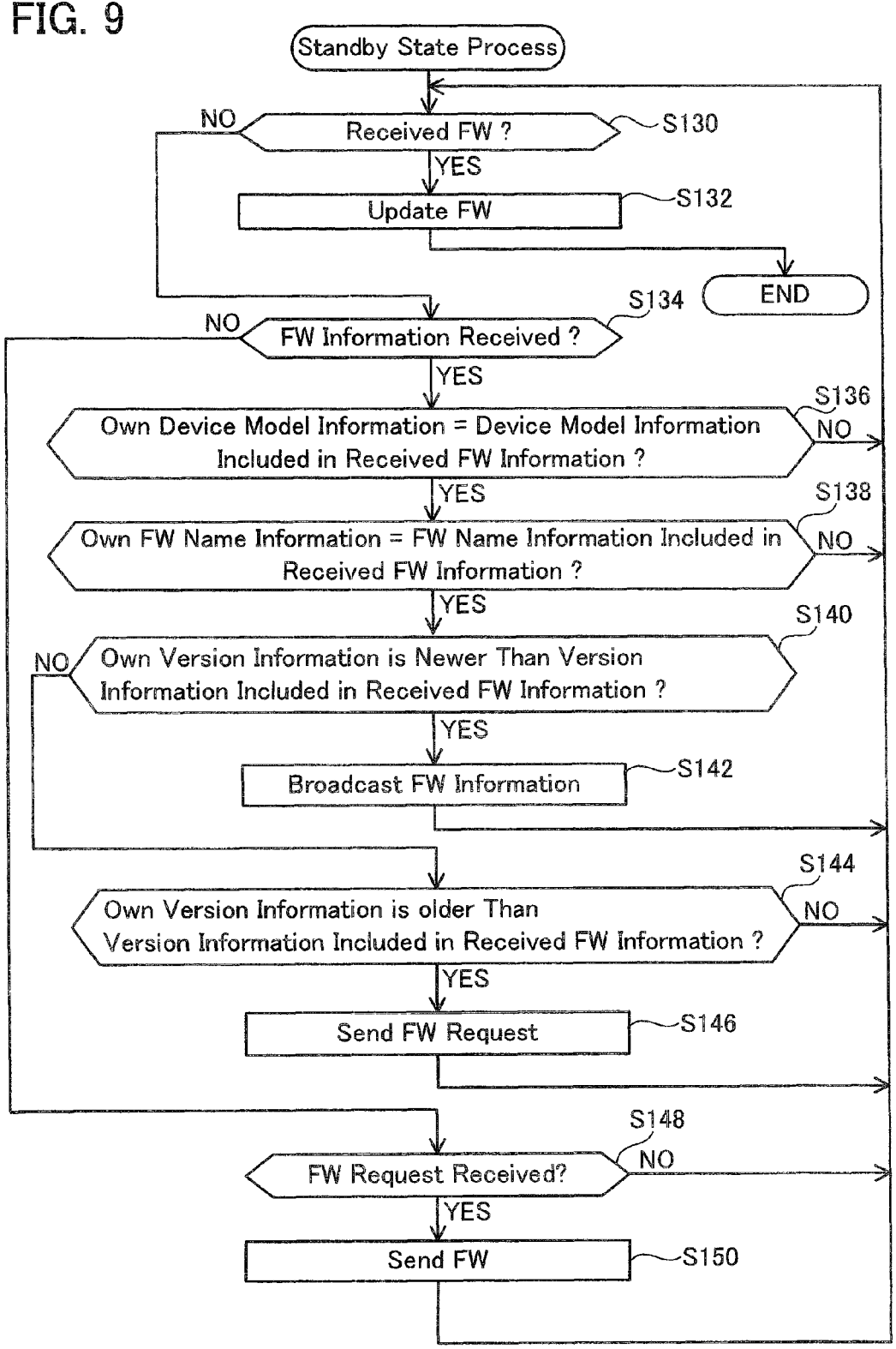
FIG. 9 shows a flowchart of standby state processing.

MODIFIED EXAMPLES (1) After broadcasting the FW information at S106 in FIG. 8, the controlling unit 12 executes a standby process of S108. Similar to this, the controlling unit 12 may also execute a standby process after S142 of FIG. 9. Upon receiving a specific FW request and receiving specific FW information including version information newer than its own version information 36 during this standby process, the controlling unit 12 may also not send the firmware in response to the above-mentioned specific FW request. In this case, the controlling unit 12 may send a FW request to a sending origin of the above-mentioned specific FW information.

(2) In the above-described standby state process of FIG. 9, the controlling unit 12 broadcasts the FW information only in a case of YES at S140. However, the standby state process of FIG. 9 may also be configured such that the FW information is broadcasted periodically. It should be noted that although the FW information is broadcasted in the above-described embodiment, other techniques (e.g., multicasting or unicasting or the like) may be used to send the FW information to the printers such as the printer 10 in the LAN 100.

(3) In the above-described embodiment, a communication system 2 was disclosed including a plurality of printers such as the printer 10. However, the present embodiment can be applied to a communication system including a plurality of communication devices of other types (e.g., PCs, servers, PDAs, cellular phones, fax machines, copiers, scanners, and multifunction machines).

(4) The first printer 10 may also send updated firmware information periodically (e.g., every hour) without sending the updated firmware information at a time of booting a firmware.

(5) Terminology in the above-mentioned "the first printer 10 sends updated firmware information" is not limited to the first printer 10 sending updated firmware information for the first time after the firmware has been updated. For example, in a case where after the firmware has been updated and the first printer 10 sends updated firmware information for a first time due to being rebooted, after which the first information sending unit sends the updated firmware information for a second time due to the power being turned off and then turned on again, the above-mentioned terminology includes the first time of sending the updated firmware information and also includes the second time of sending updated firmware information.

It should be noted that the control method and computer program for achieving the above-described printers 10, 50, 60, 70, and 80 are novel and useful. The media that store this computer program are also novel and useful. Furthermore, the communication system provided with the above-described printers such as the printer 10 is also novel and useful.

What is claimed is:

1. A communication device to be connected with a network, the communication device comprising:
   a storing unit configured to store a firmware; and
   a controlling unit configured to communicate with a plurality of communication devices connected with the network, each of the plurality of communication devices configured to operate in accordance with its own firmware,
   wherein the controlling unit comprises:
   an information sending unit configured to send firmware information including version information of a current firmware currently stored in the storing unit to the plurality of communication devices when the current firmware is booted;
   a request receiving unit configured to receive a firmware request from a first communication device included in the plurality of communication devices, wherein the first communication device has a first firmware with older version information than the version information of the current firmware; and
   a firmware sending unit configured to send the current firmware currently stored in the storing unit to the first communication device in response to the firmware request from the first communication device.

2. The communication device as in claim 1, wherein
the controlling unit further comprises:
an information receiving unit configured to receive second firmware information sent from a second communication device included in the plurality of communication devices, the second firmware information including version information of a second firmware that the second communication device has;
a request sending unit configured to send a firmware request to the second communication device in a first case where the version information of the second firmware is newer than the version information of the current firmware currently stored in the storing unit;
a firmware receiving unit configured to receive the second firmware sent from the second communication device in response to the firmware request; and
an updating unit configured to update the current firmware currently stored in the storing unit to the second firmware.

3. The communication device as in claim 2, wherein
the firmware information further includes device model information of the second communication device, and
the request sending unit is configured to send the firmware request to the second communication device in the first case, if the device model information of the second communication device matches device model information of the communication device.

4. The communication device as in claim 2, wherein
the information sending unit is configured to send updated firmware information including the version information of the second firmware to the plurality of communication devices after the updating unit updates to the second firmware;
the request receiving unit is configured to receive a firmware request sent from a third communication device included in the plurality of communication devices, wherein the third communication device has a third firmware with older version information than the version information of the second firmware; and
the firmware sending unit is configured to send the second firmware currently stored in the storing unit to the third communication device in response to the firmware request from the third communication device.

5. The communication device as in claim 4, wherein
the information sending unit is configured to send the updated firmware information when the second firmware is booted.

6. The communication device as in claim 5, wherein
the information sending unit is configured to send the updated firmware information after a time period set in a random manner elapses since the second firmware is booted.

7. The communication device as in claim 4, wherein
in a case where the information receiving unit receives firmware information sent from a fourth communication device included in the plurality of communication devices before the information sending unit sends the updated firmware information, wherein the firmware information from the fourth communication device includes version information of a fourth firmware that the fourth communication device has:
the information sending unit is configured not to send the updated firmware information in a second case where the version information of the fourth firmware matches the version information of the second firmware; and
the information sending unit is configured to send the updated firmware information in a third case where the version information of the fourth firmware does not match the version information of the second firmware.

8. The communication device as in claim 7, wherein
in the third case:
the request sending unit is configured to send a firmware request to the fourth communication device if the version information of the fourth firmware is newer than the version information of the second firmware; and
the information sending unit is configured to send the updated firmware information if the version information of the fourth firmware is older than the version information of the second firmware.

9. The communication device as in claim 2, wherein
the information sending unit is configured to send firmware information including the version information of the current firmware currently stored in the storing unit to the plurality of communication devices in a case where the version information of the second firmware included in the firmware information from the second communication device is older than the version information of the current firmware.

* * * * *